United States Patent
Manuel et al.

(10) Patent No.: US 10,597,761 B2
(45) Date of Patent: Mar. 24, 2020

(54) SELF-REPAIRING METAL ALLOY MATRIX COMPOSITES, METHODS OF MANUFACTURE AND USE THEREOF AND ARTICLES COMPRISING THE SAME

(71) Applicants: University of Florida Research Foundation, Inc., Gainesville, FL (US); United States Of America As Represented By The Administrator Of The National Aeronautics And Space Administration, Washington, DC (US)

(72) Inventors: Michele Viola Manuel, Gainesville, FL (US); Charles Robert Fisher, Fairfax, VA (US); Maria Clara Wright, Orlando, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 466 days.

(21) Appl. No.: 15/318,194

(22) PCT Filed: Jun. 12, 2015

(86) PCT No.: PCT/US2015/035458
§ 371 (c)(1),
(2) Date: Dec. 12, 2016

(87) PCT Pub. No.: WO2016/003627
PCT Pub. Date: Jan. 7, 2016

(65) Prior Publication Data
US 2017/0121800 A1  May 4, 2017

Related U.S. Application Data

(60) Provisional application No. 62/011,222, filed on Jun. 12, 2014.

(51) Int. Cl.
*C22C 1/10* (2006.01)
*C22C 21/02* (2006.01)
(Continued)

(52) U.S. Cl.
CPC .............. *C22F 1/006* (2013.01); *B22D 19/00* (2013.01); *B22D 21/007* (2013.01);
(Continued)

(58) Field of Classification Search
None
See application file for complete search history.

(56) References Cited

U.S. PATENT DOCUMENTS 3,685,005 A   8/1972  D'Alessandro
4,350,528 A   9/1982  Engle
(Continued)

OTHER PUBLICATIONS

Liu, K. et al., "Solidification of Iron-Rich Intermaetallic Phases in Al-4.5Cu-0.3Fe Cast Alloy", Metallurgical and Materials Transactions A, vol. 42A, Jul. 2011, pp. 2004-2016.*
(Continued)

*Primary Examiner* — George Wyszomierski
(74) *Attorney, Agent, or Firm* — Thomas|Horstemeyer, LLP

(57) ABSTRACT

Disclosed herein is a composite comprising a metal alloy matrix; where the metal alloy matrix comprises aluminum in an amount greater than 50 atomic percent; a first metal and a second metal; where the first metal is different from the second metal; and where the metal alloy matrix comprises a low temperature melting phase and a high temperature melting phase; where the low temperature melting phase melts at a temperature that is lower than the high temperature melting phase; and a contracting constituent; where the contracting constituent exerts a compressive force on the metal alloy matrix at a temperature between a melting point
(Continued)

of the low temperature melting phase and a melting point of the high temperature melting phase or below the melting points of the high and low temperature melting phases.

46 Claims, 15 Drawing Sheets

(51) Int. Cl.
*C22F 1/00* (2006.01)
*C22C 21/14* (2006.01)
*B32B 15/20* (2006.01)
*C22C 1/04* (2006.01)
*C22C 49/14* (2006.01)
*C22C 49/06* (2006.01)
*B22D 19/00* (2006.01)
*B22D 21/00* (2006.01)
*B22F 1/00* (2006.01)
*C22F 1/043* (2006.01)
*C22F 1/057* (2006.01)

(52) U.S. Cl.
CPC ............ *B22F 1/0003* (2013.01); *B32B 15/20* (2013.01); *C22C 1/0416* (2013.01); *C22C 1/1036* (2013.01); *C22C 1/1084* (2013.01); *C22C 21/02* (2013.01); *C22C 21/14* (2013.01); *C22C 49/06* (2013.01); *C22C 49/14* (2013.01); *C22F 1/043* (2013.01); *C22F 1/057* (2013.01); *B22F 2301/15* (2013.01); *B32B 2307/54* (2013.01)

(56) References Cited

U.S. PATENT DOCUMENTS

| | | |
|---|---|---|
| 5,093,065 A | 3/1992 | Creedon |
| 5,156,806 A | 10/1992 | Sutula et al. |
| 2003/0187497 A1 | 10/2003 | Boylan et al. |
| 2010/0003536 A1 | 1/2010 | Smith et al. |
| 2011/0033721 A1* | 2/2011 | Rohatgi ................ B22D 19/14 428/548 |
| 2012/0174571 A1 | 7/2012 | Villanueva et al. |
| 2012/0251777 A1* | 10/2012 | Duval .................... B22F 1/02 428/144 |
| 2013/0266470 A1 | 10/2013 | Roth-Fagaraseanu et al. |
| 2013/0340896 A1* | 12/2013 | Rohatgi ................ C22C 49/14 148/402 |
| 2017/0051156 A1* | 2/2017 | Chilukuri ............... C23C 4/06 |

OTHER PUBLICATIONS

Moghadam, A.D. et al., "Functional Metal Matrix Composites: Self-lubricating, Self-healing, and Nanocomposites—An Outlook", Journal of Metals, col. 66, No. 6, pp. 872-881, published online Apr. 5, 2014.*

Murray, G.T. et al., ASM Handbook, vol. 2: Properties and Selection: Nonferrous Alloys and Special-Purpose Materials, "Preparation and Characterization of Pure Metals", pp. 1093-1097, Copyright 1990 ASM International.*

International Search Report for PCT/US2015/035458 dated Jan. 4, 2016.

* cited by examiner

SELF-REPAIRING METAL ALLOY MATRIX COMPOSITES, METHODS OF MANUFACTURE AND USE THEREOF AND ARTICLES COMPRISING THE SAME

CROSS-REFERENCE TO RELATED APPLICATIONS

This application is the 35 U.S.C. § 371 national stage application of PCT Application No. PCT/US2015/035458, filed Jun. 12, 2015, where the PCT claims priority to and the benefit of. U.S. Provisional Application No. 62/011,222 filed Jun. 12, 2014, both of which are herein incorporated by reference in their entirety.

STATEMENT REGARDING FEDERALLY SPONSORED RESEARCH & DEVELOPMENT

This invention was made with government support under Contract Number NNX12AP71A awarded by NASA. The government has certain rights in the invention.

BACKGROUND

This disclosure relates to self-repairing metal alloy matrix composites, methods of manufacture and use thereof and articles comprising the same.

Metal materials, such as aluminum alloys, have been investigated for use in aerospace equipment. Although properties of aluminum such as cost and weight are desirable for aerospace and other lightweight material applications, during operation such materials can be subjected to physical stresses due to cyclic loading, resulting in the formation of fatigue cracks, and subsequently, may lead to fatigue failure.

To repair fatigue cracks, additional materials, skilled application of a repair technique and/or direct access are generally utilized. For example, repair methods may include drilling the crack tip to blunt the crack in order to prevent further crack propagation, grinding out the crack and using weld overlays to obtain the desired part thickness, using a doubler to reinforce the material surrounding the crack, applying selective plating over the crack, applying polymeric fillers to fill the crack, or applying thermal sprays over the crack. However, since these repair techniques involve additional materials, skilled external application and/or direct access, these techniques may not be desirable in aerospace applications, such as those in space flight. Further, repair techniques involving doublers pose challenges with regard to bonding and surface preparation in aerospace application. In addition, weld overlays, while suitable for some metal alloys such as steel-based alloys, pose challenges in terms of reduced strength when applied to aluminum-based structural materials.

It is therefore desirable to develop metal alloy matrix composites and methods of making thereof which have self-repairing capabilities to facilitate the closure and/or repair of fatigue cracks and/or to avoid one or more of the challenges described above.

SUMMARY

Disclosed herein is a composite comprising a metal alloy matrix; where the metal alloy matrix comprises aluminum in an amount greater than 50 atomic percent; a first metal and a second metal; where the first metal is different from the second metal; and where the metal alloy matrix comprises a low temperature melting phase and a high temperature melting phase; where the low temperature melting phase melts at a temperature that is lower than the high temperature melting phase; and a contracting constituent; where the contracting constituent exerts a compressive force on the metal alloy matrix at a temperature between a melting point of the low temperature melting phase and a melting point of the high temperature melting phase or below the melting point of the low and high melting phase.

Disclosed herein too is a method comprising blending aluminum, a first metal, a second metal and a contracting constituent to form a composite; where the first metal is different from the second metal; and where the aluminum, the first metal and the second metal form a metal alloy matrix that comprises a low temperature melting phase and a high temperature melting phase; where the low temperature melting phase melts at a temperature that is lower than the high temperature melting phase; where the contracting constituent exerts a compressive force on the metal alloy matrix at a temperature between a melting point of the low temperature melting phase and a melting point of the high temperature melting phase or below the melting point of the low and high melting phase; and forming the composite into an article.

Disclosed herein too is a method comprising heating a composite comprising a metal alloy matrix; where the metal alloy matrix comprises aluminum in an amount greater than 50 atomic percent; a first metal and a second metal; where the first metal is different from the second metal; and where the metal alloy matrix comprises a low temperature melting phase and a high temperature melting phase; where the low temperature melting phase melts at a temperature that is lower than the high temperature melting phase; and a contracting constituent; where the contracting constituent exerts a compressive force on the metal alloy matrix at a temperature between a melting point of the low temperature melting phase and a melting point of the high temperature melting phase or below the melting point of the low and high melting phase; and cooling the composite.

Disclosed herein is a composite comprising a metal alloy matrix; where the metal alloy matrix comprises aluminum in an amount greater than 50 to 99.9 atomic percent; a first metal dispersed in the metal alloy matrix, where the first metal is present in an amount of 0.1 to 50 atomic percent; and where the metal alloy matrix comprises a low temperature melting phase and a high temperature melting phase; where the low temperature melting phase melts at a temperature that is lower than the high temperature melting phase; and a contracting constituent; where the contracting constituent exerts a compressive force on the metal alloy matrix at a temperature between a melting point of the low temperature melting phase and a melting point of the high temperature melting phase or below the melting point of the low and high melting phase.

Disclosed herein too is a method comprising blending aluminum a first metal, and a contracting constituent to form a composite; and where the aluminum and the first metal form a metal alloy matrix that comprises a low temperature melting phase and a high temperature melting phase; where the low temperature melting phase melts at a temperature that is lower than the high temperature melting phase; where the contracting constituent exerts a compressive force on the metal alloy matrix at a temperature between a melting point of the low temperature melting phase and a melting point of the high temperature melting phase or below the melting point of the low and high melting phase; and forming the composite into an article.

Disclosed herein too is a method comprising heating a composite comprising a metal alloy matrix; where the metal alloy matrix comprises aluminum in an amount greater than 50 to 99 atomic percent; a first metal dispersed in the metal alloy matrix, where the first metal is present in an amount of 1 to 50 atomic percent; and where the metal alloy matrix comprises a low temperature melting phase and a high temperature melting phase; where the low temperature melting phase melts at a temperature that is lower than the high temperature melting phase; and a contracting constituent; where the contracting constituent exerts a compressive force on the metal alloy matrix at a temperature between a melting point of the low temperature melting phase and a melting point of the high temperature melting phase or below the melting point of the low and high melting phase; and cooling the composite.

DETAILED DESCRIPTION

Aluminum-Silicon System

Disclosed herein is a self-healing composite (hereinafter the "composite") that comprises a metal alloy matrix in which is reinforced by a constituent that undergoes contraction upon heating (hereinafter the "contracting constituent"). The metal alloy matrix comprises a metal alloy having a plurality of phases that contain the same elements at least one of which is a high temperature melting phase while the others are a low temperature melting phase. In other words, the one or more low temperature melting phases melt at a lower temperature than the high temperature melting phase.

The composite is capable of self-repairing large-scale cracks that have propagated through the matrix during the service life of the component. When a crack is present in the metal alloy matrix, the composite is heated in order to facilitate self-healing. The heating is conducted to a temperature where the lower temperature melting phase undergoes melting and where the contracting constituent is activated to begin contracting. The compressive forces brought about by the contracting constituent draws the opposing surfaces (on either surface of the crack) together where the low temperature melting phase (now in the form of a liquid) facilitates bonding of the two opposing surfaces. The composite is thus repaired without any significant use of external compressive forces, without using any techniques that are used for repair such as welding, brazing, soldering, bonding with an adhesive, or the like.

Figure 1:
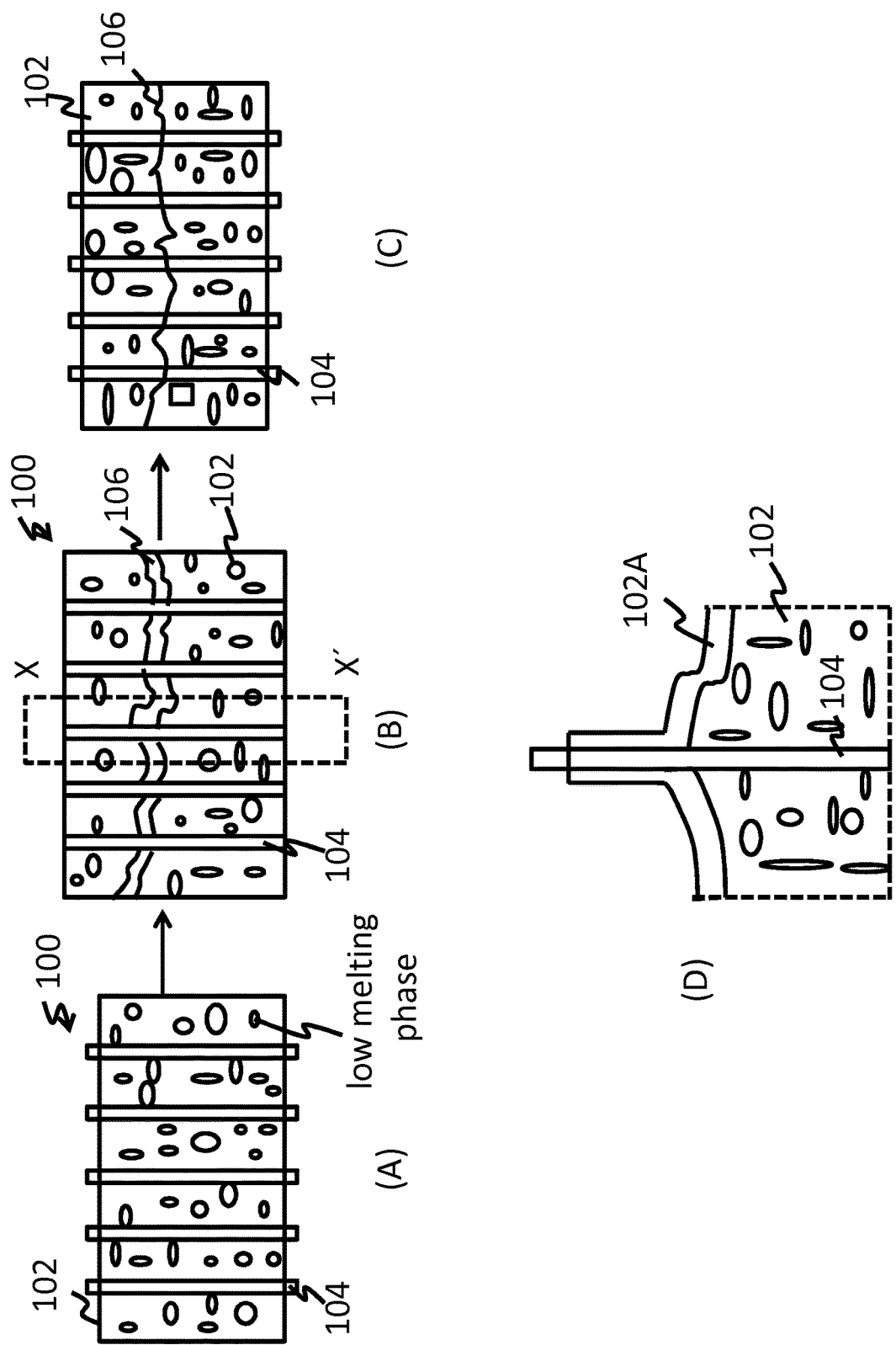
FIG. 1(A) is a depiction of the composite comprising a metal alloy matrix and a contracting constituent.
FIG. 1(B) is a depiction of the composite with a crack.
FIG. 1(C) is a depiction of the composite after it is heated to above the melting point of the lower melting temperature phase and below the temperature of the higher melting temperature phase or below the melting point of the low and high melting phase.
FIG. 1(D) is a depiction of section X-X' of FIG. 1(B) showing the molten portion of the low temperature melting phase when it is heated to above its melting point.

FIG. 1(A) is a depiction of an article 100 that comprises the exemplary self-healing metal matrix alloy 102 in which is dispersed the contracting constituent 104. As the article is subjected to external loading as seen in the FIG. 1(B), a crack 106 develops and propagates through the metal matrix alloy 102 but not through the contracting constituent 104. Upon heating the composite article 100 (as seen in the FIG. 1(C)) to the desired temperature, the contracting constituent undergoes a phase transformation bringing the opposing crack faces together, while at the same time, the melting phase undergoes melting and facilitates the bonding of the opposing crack faces by filling in any remaining gaps, thus repairing the article 100. This is a two-step crack repair method, first is crack closure from contraction of the contracting constituent, and second is crack repair during partial liquefaction of the matrix. Both steps are accomplished by heating the crack area to a predetermined temperature.

The FIG. 1(D) is an expanded depiction of the section X-X' of the FIG. 1(B). As can be seen in the FIG. 1(D), when the composite is heated to a temperature above the melting point of the low temperature melting phase, the low temperature melting phase melts to form a liquid 102A. The liquid 102A spreads along the interface. When the contracting constituent exerts a compressive force on the opposing surfaces of the crack, the liquid at the interface spreads along the interface and solidifies upon cooling, thus promoting self-healing of the composite. The liquid 102A may form a film along the entire crack or along only a portion of the crack.

The metal matrix alloy comprises a base metal (i.e., a metal that is present in an amount large enough to act as the matrix of the metal matrix alloy) that may be selected from the group consisting of aluminum, copper, tin, lead, cadmium, zinc, indium, bismuth, gallium, magnesium, lithium, calcium, silicon, antimony, or the like. In one embodiment, the metal matrix alloy comprises an aluminum base.

To the base metal is added a first metal. The first metal is capable of mixing with the aluminum to produce two or more phases having different melting temperatures. One of these phases is a high temperature melting phase and the other phase is a low temperature melting phase. The base metal is always different from the first metal. In an exemplary embodiment, the first metal is silicon, copper, tin, lead, cadmium, zinc, indium, bismuth, silicon, gallium, magnesium, lithium, calcium, antimony, or the like. In an exemplary embodiment, the first metal is silicon.

The aluminum is present in an amount of 50 to 99.9, specifically 60 to 98, and more specifically 70 to 97 atomic percent, based on the total atomic composition of the composite. The silicon is present in an amount of 1 to 50, specifically 2 to 40, and more specifically 3 to 30 atomic percent, based on the total atomic composition of the composite. In an exemplary embodiment, the nominal bulk composition of the metal alloy matrix is: Al-3.0 Si (all compositions in atomic percent).

The aluminum silicon alloy has a high temperature melting phase and a low temperature melting phase. The low temperature melting phase is generally present in an amount of 5 to 23 volume percent specifically 18 to 22 volume percent, based on the volume of the metal.

The lower temperature melting phase generally melts at a temperature of 560 to 620° C., specifically 580 to 610° C. and more specifically 585 to 600° C.

Aluminum-Silicon-Copper System

Disclosed herein is a self-healing composite (hereinafter the "composite") that comprises a metal alloy matrix in which is reinforced by a constituent that undergoes contraction upon heating (hereinafter the "contracting constituent"). The metal alloy matrix comprises a metal alloy having a plurality of phases that contain the same elements at least one of which is a high temperature melting phase while the others are a low temperature melting phase. In other words, the one or more low temperature melting phases melt at a lower temperature than the high temperature melting phase.

The composite is capable of self-repairing large-scale cracks that have propagated through the matrix during the service life of the component. When a crack is present in the metal alloy matrix, the composite is heated in order to facilitate self-healing. The heating is conducted to a temperature where the lower temperature melting phase undergoes melting and where the contracting constituent is activated to begin contracting. The compressive forces brought about by the contracting constituent draws the opposing surfaces (on either surface of the crack) together where the low temperature melting phase (now in the form of a liquid) facilitates bonding of the two opposing surfaces. The composite is thus repaired without any significant use of compressive forces, without using any techniques that are used for repair such as welding, brazing, soldering, bonding with an adhesive, or the like.

FIG. 1(A) is a depiction of an article 100 that comprises the exemplary self-healing metal matrix alloy 102 in which is dispersed the contracting constituent 104. As the article is subjected to external loading as seen in the FIG. 1(B), a crack 106 develops and propagates through the metal matrix alloy 102 but not through the contracting constituent 104. Upon heating the composite article 100 (as seen in the FIG. 1(C)) to the desired temperature, the contracting constituent undergoes a phase transformation bringing the opposing crack faces together, while at the same time, the melting phase undergoes melting and facilitates the bonding of the opposing crack faces by filling in any remaining gaps, thus repairing the article 100. In one embodiment, the contracting constituent first bring about crack closure, and then the liquefaction of the lower melting phase occurs thus facilitating healing of the crack. This is a two-step crack repair method, first is crack closure from contraction of the contracting constituent, and second is crack repair during partial liquefaction of the matrix. Both steps are accomplished by heating the crack area to a predetermined temperature.

The FIG. 1(D) is an expanded depiction of the section X-X' of the FIG. 1(B). As can be seen in the FIG. 1(D), when the composite is heated to a temperature above the melting point of the low temperature melting phase, the low temperature melting phase melts to form a liquid 102A. The liquid 102A spreads along the interface. When the contracting constituent exerts a compressive force on the opposing surfaces of the crack, the liquid at the interface spreads along the interface and solidifies upon cooling, thus promoting self-healing of the composite. The liquid 102A may form a film along the entire crack or along only a portion of the crack.

The metal matrix alloy comprises a base metal (i.e., a metal that is present in an amount large enough to act as the matrix of the metal matrix alloy) that may be selected from the group consisting of aluminum, copper, tin, lead, cadmium, zinc, indium, bismuth, gallium, magnesium, lithium, calcium, silicon, antimony, or the like. In one embodiment, the metal matrix alloy comprises an aluminum base.

To the base metal is added a first metal and a second metal. The first metal and the second metal are capable of mixing with the aluminum to produce two or more phases having different melting temperatures. The base metal is always different from the first metal and the second metal. The first metal is always different from the second metal. In an exemplary embodiment, the first metal is aluminum, copper, tin, lead, cadmium, zinc, indium, bismuth, gallium, magnesium, lithium, calcium, antimony, or the like, while the second metal is silicon. In another exemplary embodiment, the first metal is copper, while the second metal is silicon.

The aluminum is present in an amount of 65 to 96, specifically 80 to 94, and more specifically 85 to 93 atomic percent, based on the total atomic composition of the composite. The copper is present in an amount of 2 to 18, specifically 3 to 17, and more specifically 4 to 16 atomic percent, based on the total atomic composition of the composite. The silicon is present in an amount of 1 to 17, specifically 2 to 16, and more specifically 3 to 15 atomic percent, based on the total atomic composition of the composite. In an exemplary embodiment, the nominal bulk composition of the metal alloy matrix is: Al-4.1 Cu-2 Si (all compositions in atomic percent).

As noted above, the metal alloy matrix comprises a high temperature melting phase (also called the solid solution phase) and a low temperature melting (also referred to as the eutectic or liquid phase). In an exemplary embodiment, the composition at lower temperatures (at temperatures that are below the healing temperature range) for the lower temperature melting phase (i.e., the eutectic composition) is Al-15 Cu-7.3 Si (all compositions in atomic percent).

In one embodiment, the lower temperature melting phase may contain copper in an amount of 10 to 18 atomic percent and silicon in an amount of 5 to 10 atomic percent, based upon the total atomic content of the composition.

The higher temperature melting phase at temperatures that are below the healing temperature range (i.e., the solid solution phase) has a composition of Al-(0.5 to 2) Cu-(0.25 to 1) Si (all compositions in atomic percent). In one embodiment, the higher temperature melting phase comprises 0.1 to 4 atomic percent copper and 0.1 to 2 atomic percent silicon, based upon the total atomic content of the composition.

In another embodiment, at higher temperatures (i.e., at temperatures that are in the healing temperature range), the higher temperature melting phase has a composition of Al-1.1 Cu-0.6 Si (all compositions in atomic percent), while the lower temperature melting phase has a composition of): Al-13.4 Cu-6.6 Si (all compositions in atomic percent).

In one embodiment, the lower temperature melting phase undergoes melting at a temperature that is at least 50° C., specifically at least 100° C. and more specifically at least 150° C. lower than the temperature that the higher temperature melting phase undergoes melting.

The Contracting Constituent

In an exemplary embodiment, the contracting constituent comprises a shape memory alloy that is dispersed through the composite in the form of wires, fibers, whiskers, pillars, rods, or the like. The contracting constituent may be uniformly dispersed (i.e., the composite is isotropic), or alternatively, the contracting constituent may be heterogeneously dispersed (anisotropic) as may be seen in the FIGS. 1(A)-1(C). As can be seen in the FIGS. 1(A)-1(C), the contracting constituent is unidirectional. In an exemplary embodiment, the contracting constituent may be in the form of nanorods, nanowires, nanotubes, microwires, microtubes, or microrods.

The prefix "nano" as used herein refers to materials having diameters of less than 100 nanometers, while the prefix "micro" refers to materials having diameters of greater than 100 nanometers to 1000 micrometers.

Examples of the contracting constituent are shape memory materials or materials that have a negative coefficient of thermal expansion. It is desirable for the contracting constituent to apply a compressive force to the opposing surfaces of the crack. The contraction can occur immediate after composite failure or when heated to the appropriate temperature. In shape memory materials, this usually implies that the material undergoes reversion to its original state. The shape memory material can be any shape memory material so long as the shape memory material exhibits a shape memory effect upon heating to the temperature at which the lower temperature melting phase undergoes melting. In a preferred embodiment, the shape memory material is a shape memory alloy.

Suitable shape memory alloy materials are nickel-titanium based alloys (including high temperature modifications such as Ti(NiPt), Ti(NiPd), Ti(NiAu), (TiHf)Ni, NiTiSn, and the like), indium-titanium based alloys, nickel-aluminum based alloys, nickel-gallium based alloys, copper based alloys (e.g., copper-zinc-aluminum alloys, copper-aluminum-nickel alloys, copper-gold, and copper-tin alloys), gold-cadmium based alloys, silver-cadmium based alloys, indium-cadmium based alloys, manganese-copper based alloys, iron based alloys, (e.g., iron-platinum based alloys, iron-palladium based alloys, iron-manganese alloys, and iron-chromium alloys) and the like. The alloys can be binary, ternary, or any higher order so long as the alloy composition exhibits a shape memory effect, e.g., change in shape orientation, changes in yield strength, and/or flexural modulus properties, damping capacity, and the like. A preferred shape memory alloy is a nickel-titanium based alloy commercially available under the trademark NITINOL from Shape Memory Applications, Inc.

By heating the material above the reversion temperature of the shape memory alloy contracting constituent forces crack closure. While held at the reversion temperature, the low melting phase of the matrix partially liquifies and acts as a healing agent filling in the crack and solidifying when brought back to room temperature.

In another embodiment, the contracting constituent comprises materials that have a negative temperature coefficient of thermal expansion. Examples of materials that exhibit negative thermal expansion are cubic zirconium tungstate ($ZrW_2O_8$), members of the $AM_2O_8$ family of materials (where A=Zr or Hf, M=Mo or W) and $ZrV_2O_7$. $A_2(MO_4)_3$ also is an example of controllable negative thermal expansion. These compounds contract continuously over a temperature range of 0.3 to 1050 Kelvin.

As the temperature of the composite is increased, the negative expansion coefficient materials undergo contraction thereby forcing the opposing sides of the crack together, while the low melting phase of the matrix partially liquifies and acts as a healing agent filling in the crack and solidifying when brought back to room temperature.

The contracting constituent may be present in an amount of 2 to 40, specifically 3 to 30, and more specifically 4 to 20 weight percent, based on the total weight of the composite.

In one embodiment, in one method of manufacturing an article, the elements used in the metal alloy matrix composite are blended together, and then melted and molded to form the desired article. The elements may be in pure metal form or may be in the form of alloys, which are then blended together. When the metal alloy matrix is in the melt (during production), the contracting constituent is introduced into the mixture. It is desirable for the alloy to undergo melting at a temperature that is below the temperature where the contracting constituent is activated. (e.g., below reversion temperature of the shape memory alloy or below the temperature where the material having the negative temperature coefficient of expansion is affected).

In one embodiment, the elements used in the metal alloy matrix composite are blended, melted and/or molded at a temperature of from about 500 to about 900° C., specifically about 650 to about 850° C., and more specifically about 700 to about 800° C.

In one embodiment, in one method of using the self-repairing metal alloy matrix composite, the metal alloy matrix composite is heated to a predetermined temperature effective to produce a phase transition in the shape memory alloy element and/or a liquid assisted metal repair of the metal alloy matrix composite due to the partial liquification of the low melting eutectic phase. In an embodiment, the predetermined temperature is at least 500° C.

In one method of using the metal alloy matrix composite, the composite material is molded into an article which serves as a component that is subjected to physical stress and/or fatigue during service in for example, aeronautic applications. Fatigue cracks which are formed during operation may be repaired, by heating the component, or the area surrounding the crack therein, as described above to induce phase transformation of the shape memory alloy element in the metal alloy matrix composite and/or the partial liquification of the low melting eutectic phase of the metal alloy matrix composite. In this way, cracks of various degrees, and even cracks which may not be easily detected, may be repaired by the self-repairing metal alloy matrix composite. The method of using the self-repairing metal alloy matrix composite may be employed repeatedly as new cracks propagate through the component during operation. The metal alloy matrix composite described herein thus extends the lifetime of the service component.

In one embodiment, following the phase transition of the shape memory alloy element to close cracks present in the metal alloy matrix composite and/or the partial liquification of the low melting eutectic phase to fill in the cracks via liquid assisted metal repair, cracks present in the metal alloy matrix composite are reduced by 70% or greater, specifically 80% or greater, more specifically 90% or greater.

After healing, the composites were found to recover over 70%, specifically over 80% and more specifically over 90% of their original tensile and yield strength.

The metal alloy matrix composite described herein also avoids drawbacks associated with conventional repair materials and/or techniques since the self-repairing metal alloy matrix composite may be utilized to repair cracks therein without the use of additional materials, skilled application of the repair technique and/or direct access to the composite material or the cracks present therein, and may also be used to repair components during operation, such as those in space flight, without taking the component or equipment off-line for maintenance and repairs.

The composite may be employed as an article in aerospace equipment or any other equipment or application for which lightweight materials and/or improved fatigue performance is desired, including but not limited to, aeronautical fuel tanks (e.g., in a shuttle or other spacecraft) and nuclear reactors.

The metal alloy matrix composites, methods of manufacture thereof and articles comprising the same are exemplified by the following non-limiting examples.

EXAMPLES

Figure 2:
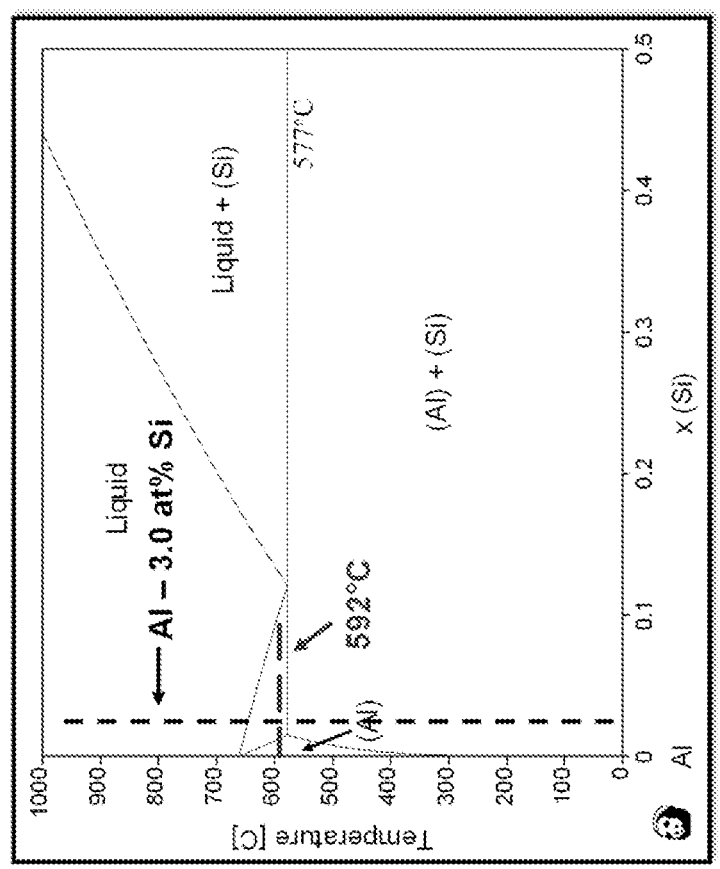
FIG. 2 shows phase diagram of Al—Si below 50% Si. At a composition of Al-3.0 at % Si (3.1 wt % Si), a healing temperature of 592° C. will yield 20% liquid.
Figure 3:
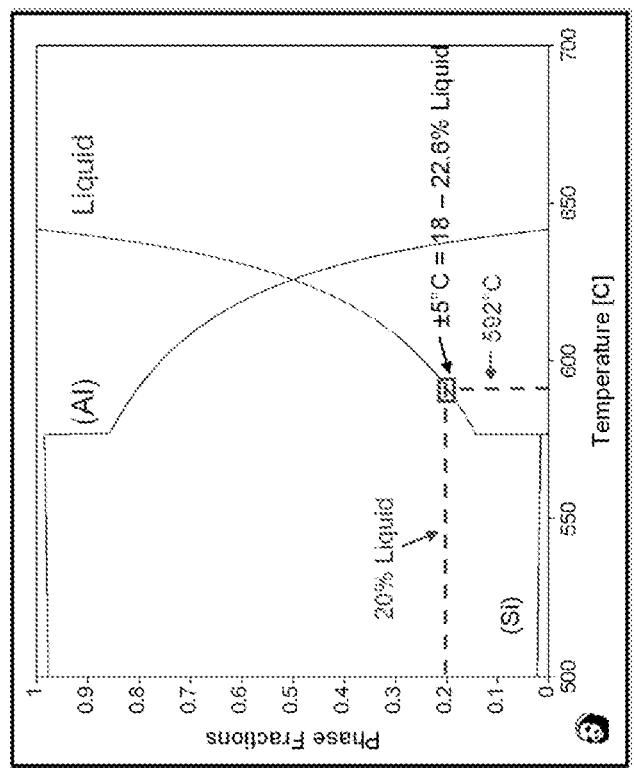
FIG. 3 shows the phase fraction of Al-3.0 at % Si at various temperatures. The heat-treatment temperature of 592° C. reveals a 20% liquid composition during the healing process. The box signifies the potential area of liquid % should the temperature fluctuate by ±5° C. during heat-treatment.

The example was conducted to demonstrate healing brought about by an aluminum (Al)-silicon (Si) system. The Al—Si system was studied because it represents an alloy system yielding moderate strength increases, a decrease in eutectic temperature, and the binary alloy known to have excellent castability. The phase diagram (see FIG. 2) was calculated using Pandat software with the PanMagnesium database. FIG. 2 shows phase diagram of Al—Si below 50% Si. At a composition of Al-3.0 at % Si (3.1 wt % Si), a healing temperature of 592° C. will yield 20% liquid. A composition of Al-3.0 at % Si (3.1 wt % Si) was selected. At this composition, the healing temperature was calculated to be 592° C. Should fluctuations occur within the furnace, 592° C. ±5° C. yields a range of only 18-22.6% liquid (see FIG. 3). FIG. 3 shows the phase fraction of Al-3.0 at % Si at various temperatures. The heat-treatment temperature of 592° C. reveals a 20% liquid composition during the healing process. The box signifies the potential area of liquid % should the temperature fluctuate by ±5° C. during heat-treatment.

Figure 4:
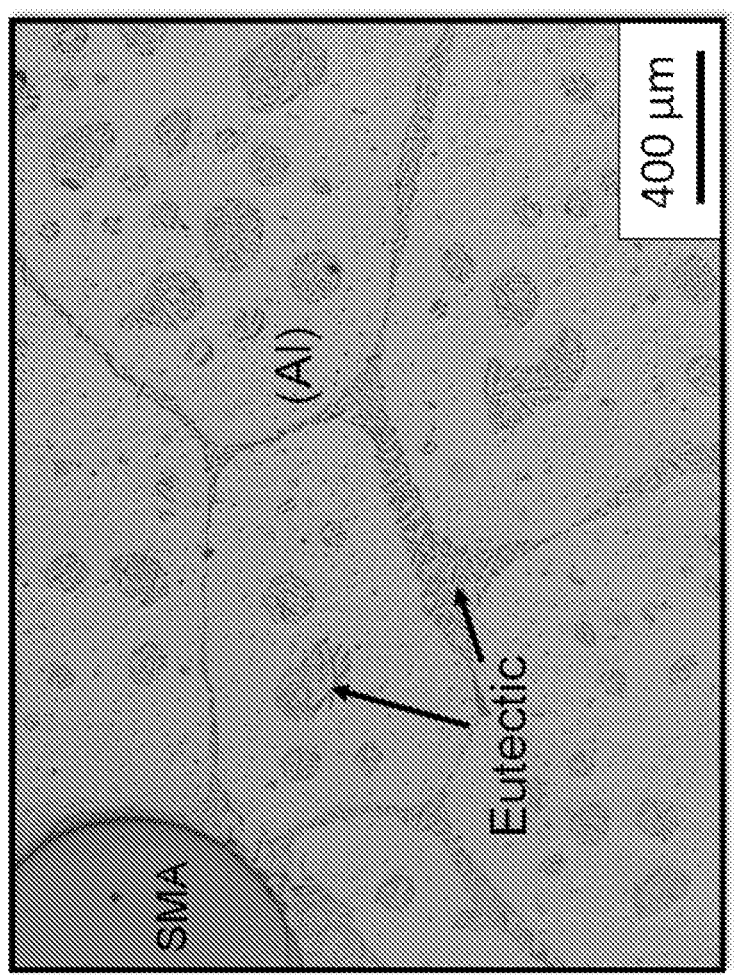
FIG. 4 shows representative microstructure of an Al-3.0 at % Si (3.1 wt % Si) composite after heat-treatment at 592° C. for 24 hours.

Al (Al shot, 99.99%, Alfa Aesar) and Si (Si lump, 99.9999%, Alfa Aesar) were melted in a furnace at 850° C. and cast into a graphite mold to create an approximately 15% Si master alloy. After verifying the composition via ICP, appropriate amounts of the Al—Si master alloy and pure Al were melted at 750° C. until a liquid solution to obtain the desired Al-3.0 at % Si composition. One NiTi SMA wire, designated BB-35 (Ni-49.3 at % Ti, Ø=0.87 mm, Memry Corporation), was laid horizontally in the graphite tensile bar mold which was heated up to 350° C. before casting to prevent casting defects. The Al—Si melt was poured over the wire into the mold and allowed to cool. Each tensile bar was placed into a furnace for 24 hours at 592° C. and then air-cooled to set the eutectic microstructure (see FIG. 4).

Figure 5:
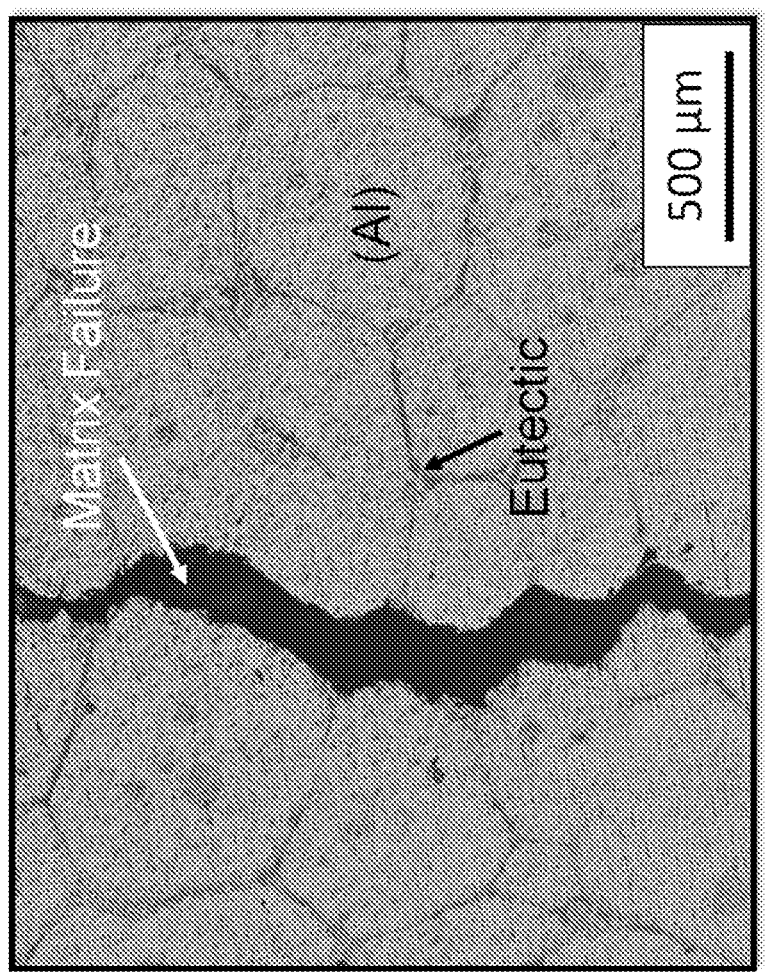
FIG. 5 depicts representative microstructure in an Al-3.0 at % Si (3.1 wt % Si) composite after heat-treatment at 592° C. for 24 hours showing failure occurring along eutectic regions.

After heat-treatment, the Al—Si tensile composite bars were ground to a 320-grit surface finish and tested in tension using the Instron 5582 machine at a rate of 1.0%/min. Results of the testing are shown in Table 1. The Al—Si composites showed moderate yield and ultimate stresses and moderate ductility in relation to the other binary alloys. The failures were found to occur along the eutectic regions as shown in FIG. 5. FIG. 5 depicts representative microstructure in an Al-3.0 at % Si (3.1 wt % Si) composite after heat-treatment at 592° C. for 24 hours showing failure occurring along eutectic regions.

TABLE 1

| Specimen | $V_f$ Wires (%) | Modulus (GPa) | 0.2% Yield Stress (MPa) | Ultimate Stress (MPa) | Failure Strain (%) |
|---|---|---|---|---|---|
| A | 2.26 | 74.9 | 38.9 | 97.2 | 4.21 |
| B | 2.00 | 48.4 | 40.2 | 83.3 | 3.18 |
| C | 2.40 | 63.1 | 39.0 | 100.4 | 4.42 |
| Avg. | 2.22 | 62.1 | 39.4 | 93.6 | 3.94 |
| ±1σ | 0.20 | 13.3 | 0.7 | 9.1 | 0.66 |

Following the virgin composite testing, the samples were encapsulated under vacuum (in Pyrex lying on a graphite strip and wrapped in Ta foil) and heat-treated a second time for 24 hours at 592° C. Following air-cooling, the Al—Si composites were tested in tension again for healing. Using Equation 3.1, the percent healing was calculated for the samples exhibiting healing (see Table 2).

TABLE 2

| Specimen | 'Healed' Ultimate Stress (MPa) | % Heal |
|---|---|---|
| A | 88.1 | 90.6 |
| B | 93.7 | 112.5 |
| C | 72.0 | 71.7 |
| | Average | 91.6 |

Figure 6:
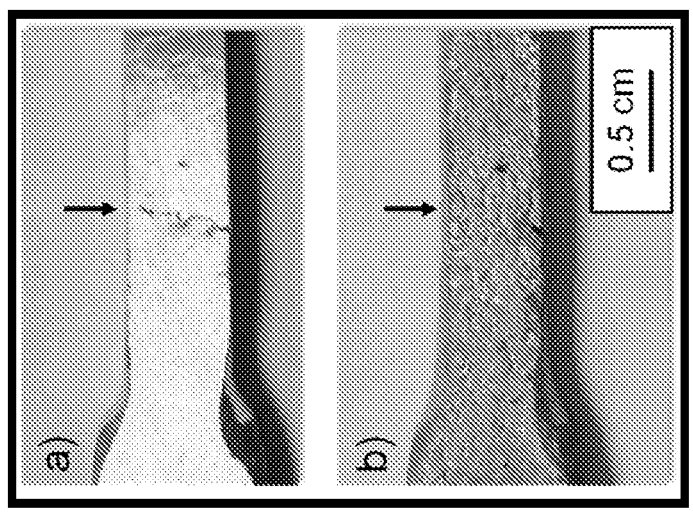
FIG. 6 shows a comparison of the a) pre-heal to b) post-heal tensile bar in an Al-3.0 at % Si composite reinforced with 2.0 vol % NiTi SMA wire.

It was noted that each specimen showed visible signs of healing (see FIG. 6); i.e., crack size reduction. FIG. 6 shows a comparison of the a) pre-heal to b) post-heal tensile bar in an Al-3.0 at % Si composite reinforced with 2.0 vol % NiTi SMA wire.

Figure 7:
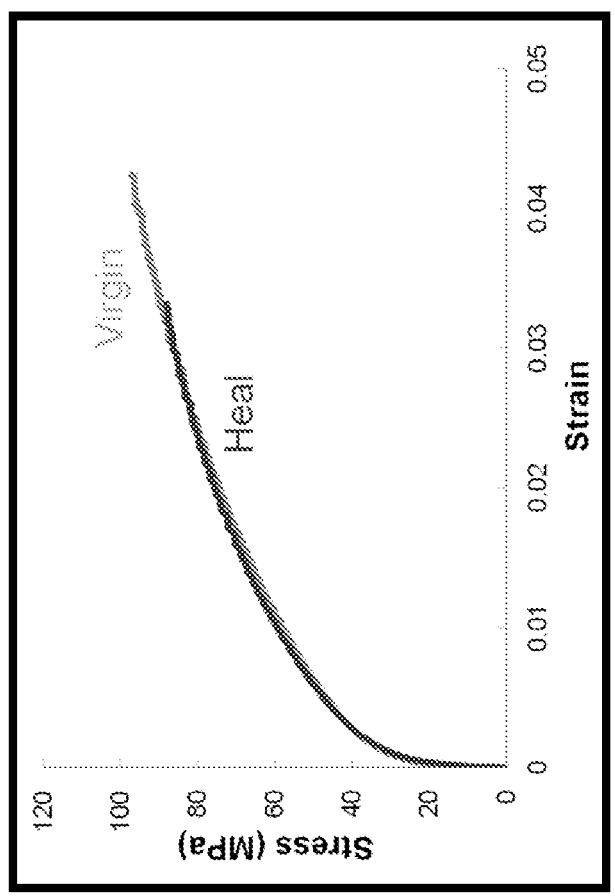
FIG. 7 shows a comparison of the virgin and healed tensile behavior of an Al-3.0 at % Si composite reinforced with 2.0 vol % NiTi SMA wire. The sample was found to possess 90.6% retained strength post-healing heat-treatment.

A comparison between the virgin and healed tensile behavior of specimen 'A' is shown in FIG. 7. FIG. 7 shows a comparison of the virgin and healed tensile behavior of an Al-3.0 at % Si composite reinforced with 2.0 vol % NiTi SMA wire. The sample was found to possess 90.6% retained tensile strength post-healing heat-treatment.

Figure 8:
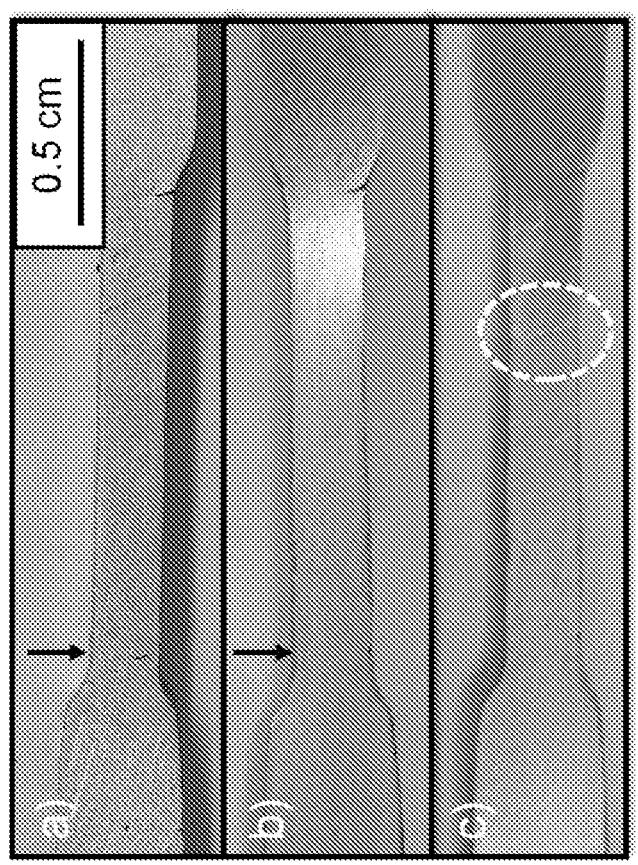
FIG. 8 shows a comparison of the a) post-tensile 1, b) post-heal and c) post-tensile 2 in an Al-3.0 at % Si composite reinforced with 2.4 vol % NiTi SMA wire.

All three of the healed composites were found to retain similar modulus and yield strength values as the virgin composite. For specimen 'B', the higher ultimate strength in the healed composite is attributed to healing the defect which caused the early failure, thereby allowing for a higher ultimate strength post-healing. In specimen 'C', the failure in the composite post-healing actually occurred in a different place than the original crack (see FIG. 8). FIG. 8 shows a comparison of the a) post-tensile 1, b) post-heal and c) post-tensile 2 in an Al-3.0 at % Si composite reinforced with 2.4 vol % NiTi SMA wire. The arrow in a) shows the original composite failure and the healed crack is shown by the arrow in b). In c) the oval shows the second failure that occurred during second tensile test.

Example 2

This example was conducted to study whether increasing the volume fraction of NiTi wires would increase healing, more Al—Si composites were manufactured as above, but with an increased number of NiTi wires. After a heat-treatment of 592° C. for 24 hours, the Al—Si tensile composite bars were ground to a 320-grit surface finish and tested in tension using the Instron at a rate of 1.0%/min. Results of the testing are shown in Table 3. The new Al—Si composites with nearly double the volume fraction of SMA wires showed more variance in the resultant elastic modulus, yield and ultimate stresses, and strain to failure in relation to the lower volume fraction composites. However, the 0.2% yield strength was found to have increased over 20% on average. The other properties were found to be statistically similar using a T-test with a 95% confidence interval.

TABLE 3

Mechanical testing results for Al—Si matrices reinforced with 3.5-4.5 vol % SMA wire reinforcements

| Specimen | $V_f$ Wires (%) | Modulus (GPa) | 0.2% Yield Stress (MPa) | Ultimate Stress (MPa) | Failure Strain (%) |
|---|---|---|---|---|---|
| D | 4.43 | 68.7 | 49.5 | 108.9 | 6.24 |
| E | 3.79 | 73.7 | 45.7 | 89.9 | 2.80 |
| Avg. | 4.11 | 71.2 | 47.6 | 99.4 | 4.52 |
| ±1σ | 0.45 | 3.5 | 2.7 | 13.4 | 2.43 |

Following the virgin composite testing, the higher volume fraction composite bars were encapsulated under vacuum (in Pyrex lying on a graphite strip and wrapped in Ta foil) and heat-treated a second time for 24 hours at 592° C. Following air-cooling, the Al—Si composites were tested in tension again for healing. The percent healing was calculated for the samples exhibiting healing (see Table 4).

TABLE 4

Healing characteristics of Al—Si composites with 3.5-4.5 vol % NiTi wires

| Specimen | 'Healed' Ultimate Stress (MPa) | % Heal |
|---|---|---|
| D | 35.1 | 32.2 |
| E | 50.2 | 55.8 |
| | Average | 44.0 |

Figure 9:
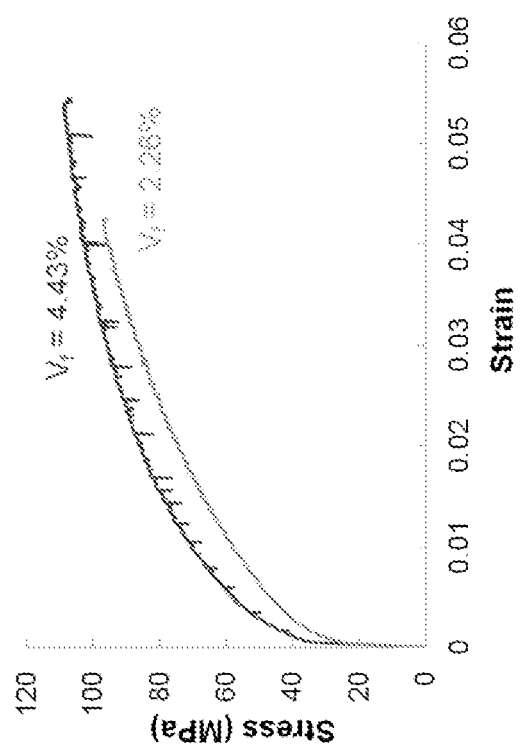
FIG. 9 shows a comparison of the virgin tensile behavior of an Al-3.0 at % Si composite reinforced with either 2.26 vol % or 4.43 vol % NiTi SMA wire.

It was noted the higher volume fraction Al—Si composites did not heal as well as the lower volume fraction composites. FIG. 9 shows a comparison of the virgin tensile behavior of an Al-3.0 at % Si composite reinforced with either 2.26 vol % or 4.43 vol % NiTi SMA wire. The higher volume fraction composites were shown to possess greater yield strengths, but exhibited debonding during tensile testing and thus lower retained strength values.

Figure 10:
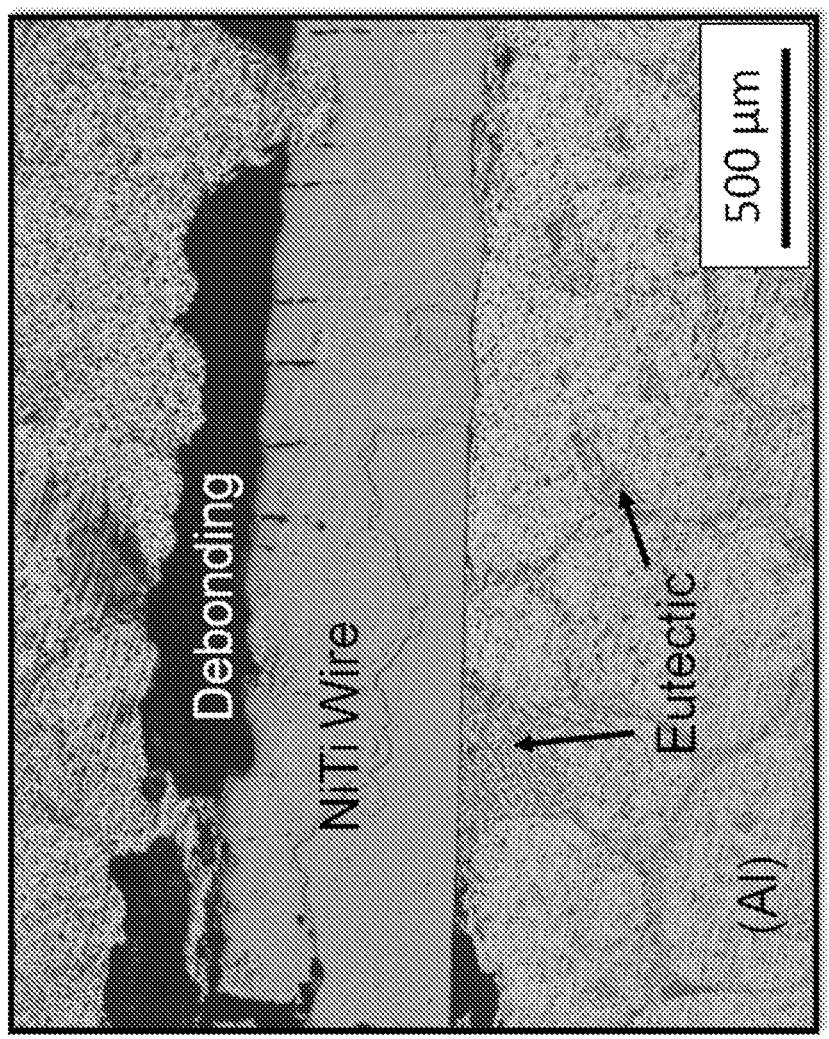
FIG. 10 shows an optical image showing debonding between an Al-3 at % Si matrix and a NiTi wire following tensile testing.

Looking at FIG. 9, when comparing specimen A to specimen D, the increase yield strength is shown. But the tensile data for specimen E also shows numerous decreases in stress followed by recovery. These decreases were accompanied by a cracking sound during testing and are attributed to debonding between the NiTi fibers and Al—Si matrix (see FIG. 10). FIG. 10 shows an optical image showing debonding between an Al-3 at % Si matrix and a NiTi wire following tensile testing.

This is thought to be the reason for the lower healing percentages found in the composites with a greater volume fraction of NiTi. Debonding would prevent the wires from pulling the matrix together when as the temperature is increased during a healing heat treatment.

Example 3

Figure 11:
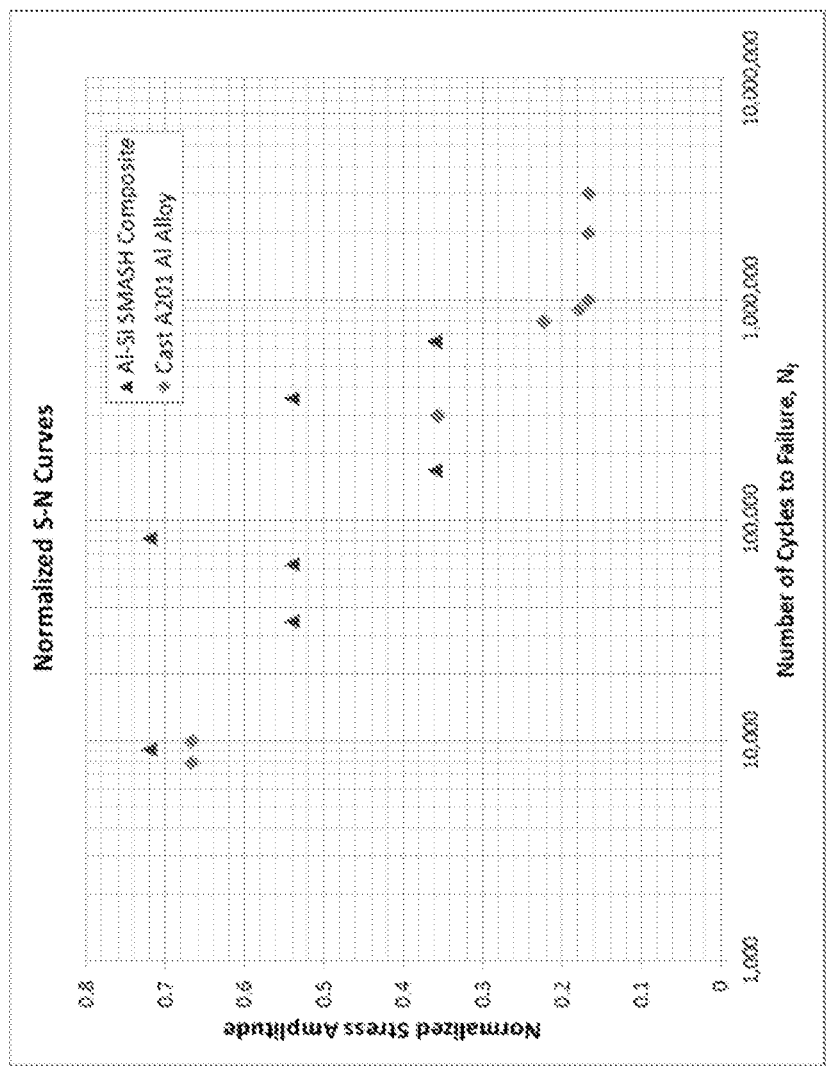
FIG. 11 depicts a comparison of S-N data from Al-3Si and A201, normalized with respect to UTS.

Fatigue testing of Al-3Si samples (E466 dogbone geometry) was carried out in order to determine the stress-life behavior of this alloy. However, there was a large amount of variability in the results, which can be attributed to casting defects such as gas evolution and shrinkage porosity due to the casting techniques. Porosity was seen throughout the tested specimen including the gage length, which was analyzed using micro CT scanning by collaborators at NASA KSC. These defects provide locations for crack initiation as well as preferred crack propagation path. Implementation of the previously discussed semisolid processing technique is expected to diminish the effects of casting defects and therefore reduce variability in fatigue life. Scanning electron microscopy was conducted to image the fracture surface of a sample after fatigue failure and it showed linear propagation of the crack until it encounters the SMA reinforcement, which then deflects the crack. Once normalized for ultimate tensile strength (UTS), Al-3Si show similar fatigue life trends when compared with a conventionally cast A201 Al alloy, as shown in FIG. 11. FIG. 11 depicts a comparison of S—N data from Al-3Si and A201, normalized with respect to UTS. This is an indication that the Al3-Si has the ability to rival conventional alloys.

An additional issue encountered with fatigue testing of conventional dogbone Al—Si samples was that stress-controlled fatigue testing created overload failure at the conclusion of the test, which proved too catastrophic to heal using this MMC system. In order to better monitor and control crack size and growth, fatigue crack growth tests were conducted on middle tension (M(T)) and single edge notch tension (ESE(T)) specimen to produce and heal a small fatigue crack. The M(T) samples were machined from a larger casting of the Al—Si alloy with embedded SMA wires with geometry based on ASTM Standard E647. Each sample had one embedded wire on either side of the machined notch, and testing was carried out with a stress amplitude ratio of R=0.1, maximum stress at 0.8 of the yield strength, and 80 Hz frequency. Crack growth measurements were taken from the center of the specimen, via interrupted testing and optical microscopy.

Figure 12:
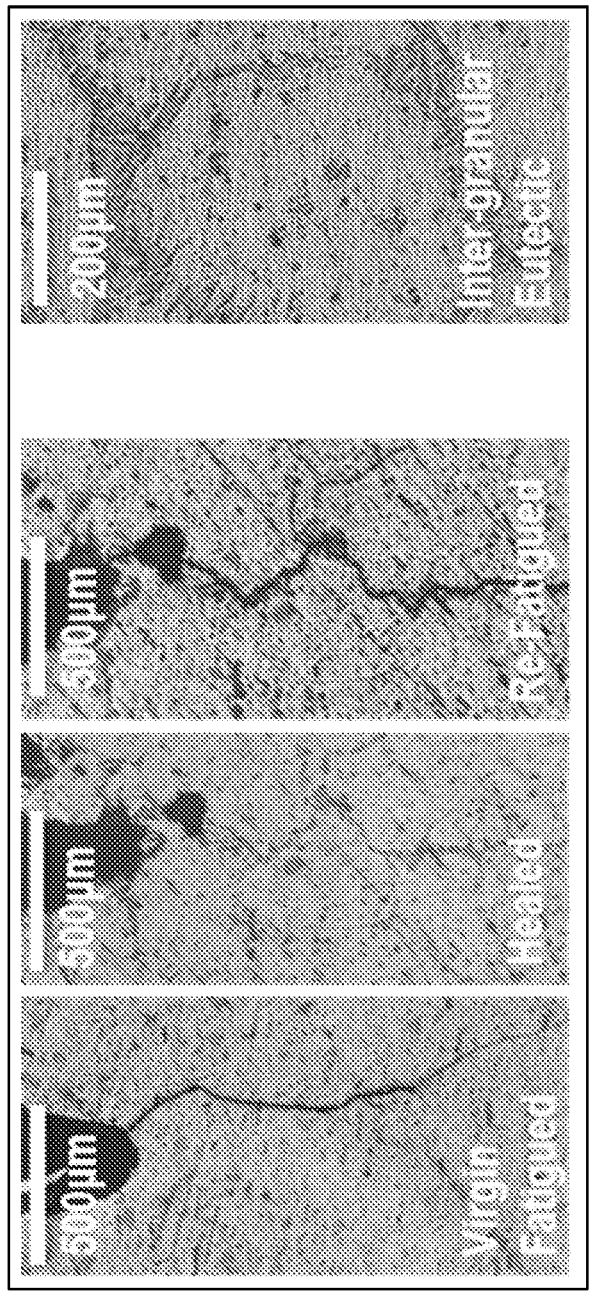
FIG. 12 shows optical micrographs of cracks extending from a pre-machined notch in M(T) sample.

It was observed that cracking initiates from the notch and propagates mostly intergranularly, following the eutectic regions. After crack propagation, samples were heat treated to heal the fatigue cracking, optical microscopy of the healed crack region was conducted, and then samples were re-tested in fatigue. The cracking path in one such M(T) sample can be seen in FIG. 12, along with the healed crack. Most notably, the eutectic distribution has been modified by heat treatment. FIG. 12 shows optical micrographs of cracks extending from a pre-machined notch in M(T) sample. Healing of the sample lead to crack closure as well as altered crack path upon further fatigue cracking. Although the previous crack may have led to a faster crack initiation and the presence of eutectic near the machined crack still provides a preferred crack path, the local modification of the microstructure proved to be beneficial. Due to the eutectic redistribution near the crack tip, the crack path was altered during subsequent fatigue testing. This secondary crack is characterized by a larger amount of crack deflection, which results in an overall lower crack growth rate, as summarized in FIG. 11. This also indicates that fatigue crack growth rate is highly dependent on local microstructure near the crack initiation site and discontinuous eutectic would improve fatigue life. It should be noted that the first recorded crack length was at approximately 100k cycles, where the first measureable fatigue crack was seen, and does not correspond to the machined notch length. Variance in post-heal crack length can be attributed to differences in amount of crack healing, as well as the amount of localized eutectic redistribution during healing.

Figure 13:
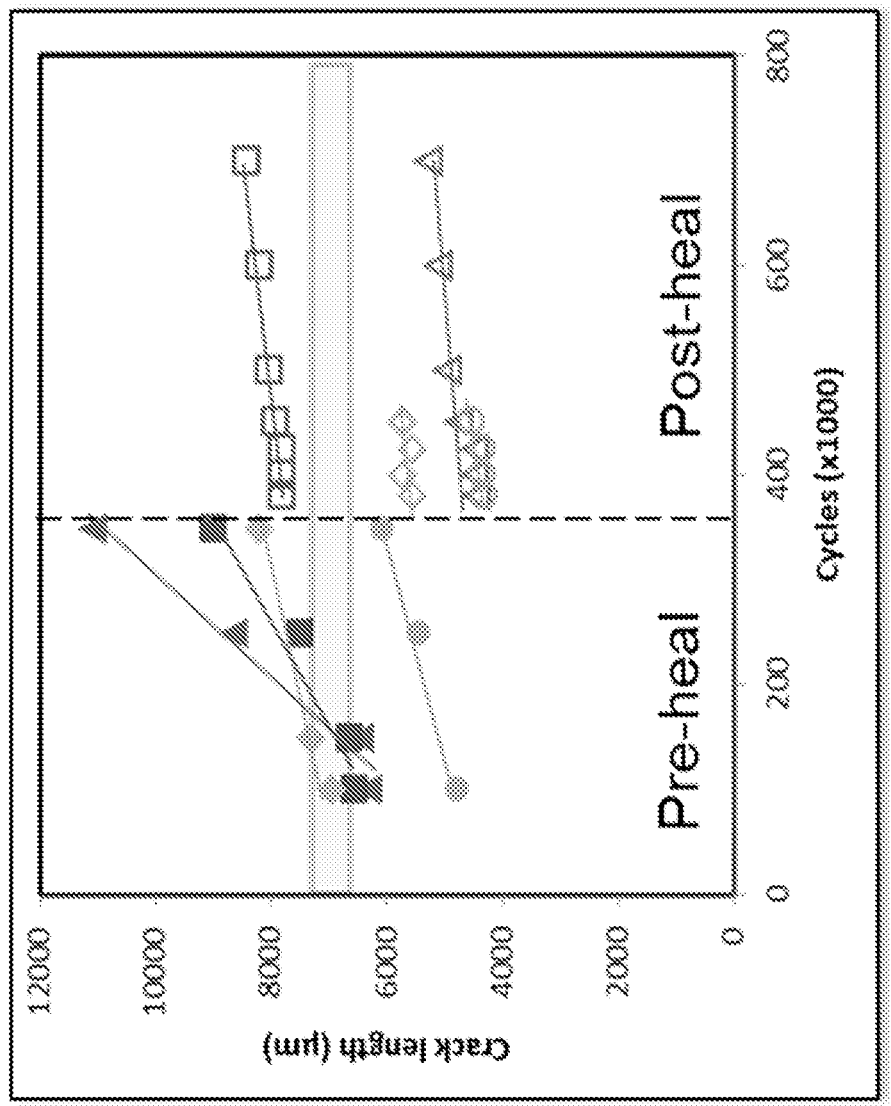
FIG. 13 shows fatigue crack growth rate from M(T) testing of Al—Si SMASH alloy. All cracks showed some crack closure, as well as reduction in crack growth rate. The grey area represents the location of SMA reinforcement.

FIG. 13 shows fatigue crack growth rate from M(T) testing of Al—Si SMASH alloy. All cracks showed some crack closure, as well as reduction in crack growth rate. The grey area represents the location of SMA reinforcement.

Figure 14:
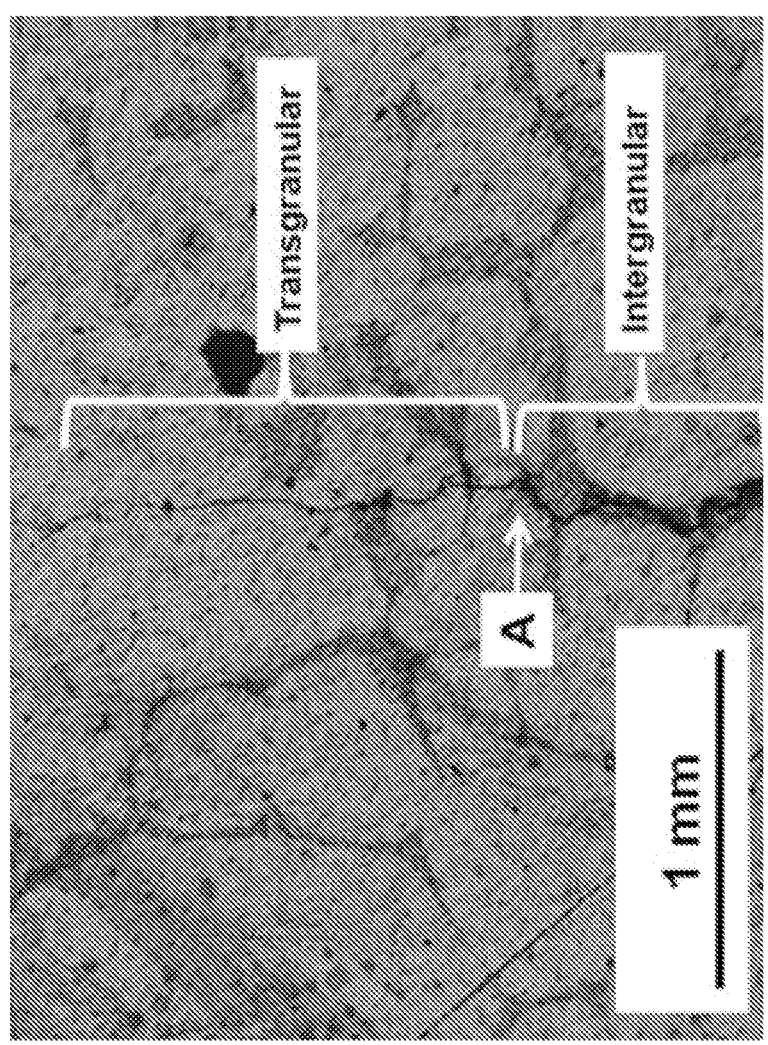
FIG. 14 shows how the crack propagated after healing. While the crack initially propagates intergranularly following the eutectic along the grain boundaries, it changes to transgranular propagation once the crack extended beyond previously healed sections of the matrix material. The figure shows an optical micrograph of AlSi ESE(T) sample after secondary fatigue cracking post initial healing.

In addition to efforts made at the UF on fatigue testing M(T) samples, ESE(T) samples were also tested in fatigue at Langley Research Center (LaRC). Specimens were made according to ASTM standard E647, tested under a constant K control, and consisted of Al—Si matrix material. The ESE(T) samples showed cracking similar to M(T) samples; cracking was observed to occur from the notch, propagating primarily intergranularly through the matrix. After sample fatigue cracking, the materials underwent the healing heat treatment under vacuum. Microstructural analysis was used to determine healing efficiency. FIG. 14 shows how the crack propagated after healing. While the crack initially propagates intergranularly following the eutectic along the grain boundaries, it changes to transgranular propagation once the crack extended beyond previously healed sections of the matrix material. FIG. 14 shows optical Micrograph of AlSi ESE(T) sample after secondary fatigue cracking post initial healing. Healing treatment led to crack closure and after continued testing, resulted in an altered crack path changing from intergranular propagation along the eutectic regions to transgranular propagation through the matrix (point "A"). This behavior is seen due to the liquid-assisted nature of the healing process, in which the liquidus phase is supplied via preferential melting of the eutectic. This liquid phase flows to the cracked region and solidifies there upon cooling. As with the M(T) samples, fatigue crack growth rates were highly dependent on the local microstructure.

Figure 15:
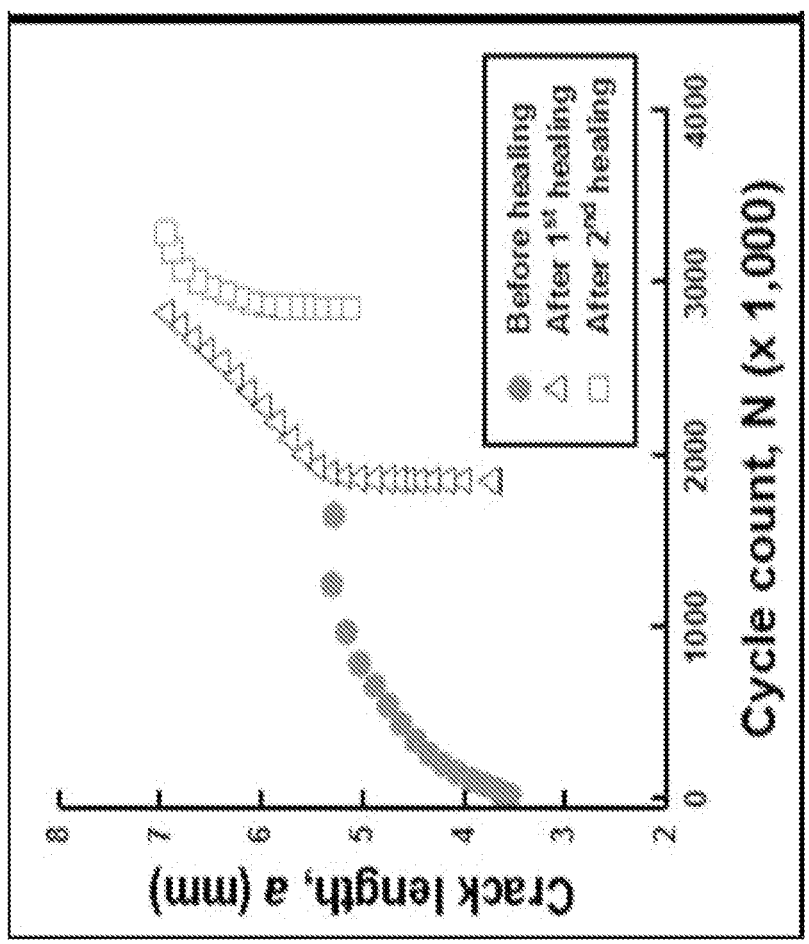
FIG. 15 below shows a graph of crack length versus the number of cycles for all three fatigue tests. The figure shows ESE(T) crack growth rate of Al—Si matrix after two healing treatment cycles. It can be seen that after the $1^{st}$ healing, the crack length returns back to the original, pre-healed pre-crack length (indicating that the healing cycle caused significant crack closure). After the second healing cycle, although the crack length did not return back to its original size, it did recover some of the damage (closing 2 mm of crack length) from the second fracture/healing event.

After microstructural analysis, one ESE(T) was subsequently re-tested in fatigue to obtain an understanding of multiple healing/fatigue cycle behavior. The sample was again healed under a heat treatment, and then again fatigued. In total, this sample received 2 healing cycles, and 3 fatigue cycles. FIG. 15 below shows a graph of crack length versus the number of cycles for all three fatigue tests. FIG. 15 shows ESE(T) crack growth rate of Al—Si matrix after two healing treatment cycles. All cracks showed some crack closure despite the lack of SMA wires, in addition to a reduction in crack length.

Changes in crack growth behavior were observed to take place after each repeated healing, indicating a transition from intergranular to transgranular fracture mechanism. It can also be noted that each healing event heals less material than previous healing events; this is potentially due to the absence of SMA wires, which provide pull-back force in the composite. This force allows for a more complete reduction in crack length. Fatigue cracks usually propagate transgranularly and it is likely that the liquid-assisted healing treatment creates a network of eutectic phase within the microstructure that affects crack propagation. It was shown that cracks propagate intergranularly along the eutectic network through healed regions and then transgranularly through material that had not been damaged previously. It is an indication that the healing treatment will close existing fatigue cracks and may deter future crack propagation. However, the healed regions are not as effective as virgin matrix regions in crack retardation. This decrease in fatigue damage tolerance may be alleviated by a secondary heat treatment after the initial healing treatment.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiment disclosed as the best mode contemplated for carrying out this disclosure.

What is claimed is:

1. A composite comprising:
a metal alloy matrix; where the metal alloy matrix comprises aluminum in an amount greater than 50 atomic percent to 99 atomic percent; a first metal and a second metal; where the first metal is different from the second metal; and where the metal alloy matrix comprises a low temperature melting phase and a high temperature melting phase; where the low temperature melting phase melts at a temperature that is lower than the high temperature melting phase; and
a contracting constituent, where the contracting constituent comprises a material having a negative coefficient of thermal expansion; where the contracting constituent exerts a compressive force on the metal alloy matrix at a temperature between a melting point of the low temperature melting phase and a melting point of the high temperature melting phase or below the temperature of the low temperature melting phase.

2. The composite of claim 1, where the first metal is copper and where the second metal is silicon.

3. The composite of claim 2, where the copper is present in an amount of 2 to 18 atomic percent, based on a total atomic composition of the metal alloy matrix.

4. The composite of claim 2, where the silicon is present in an amount of 1 to 17 atomic percent, based on a total atomic composition of the metal alloy matrix.

5. The composite of claim 1, where the aluminum is present in an amount of 65 to 96 atomic percent, based on a total atomic composition of the metal alloy matrix.

6. The composite of claim 1, where the material having a negative coefficient of thermal expansion is selected from the group consisting of $ZrW_2O_8$, $ZrMo_2O_8$, $HfW_2O_8$, $HfMo_2O_8$ and $ZrV_2O_7$.

7. The composite of claim 1, wherein the melting point of the low temperature melting phase and the melting point of the high temperature melting phase are at least 50° C. apart from each other.

8. An article comprising a composite comprising:
a metal alloy matrix; where the metal alloy matrix comprises aluminum in an amount greater than 50 atomic percent to 99 atomic percent; a first metal and a second metal; where the first metal is different from the second metal; and where the metal alloy matrix comprises a low temperature melting phase and a high temperature melting phase; where the low temperature melting phase melts at a temperature that is lower than the high temperature melting phase; and
a contracting constituent, where the contracting constituent comprises a material having a negative coefficient of thermal expansion; where the contracting constituent exerts a compressive force on the metal alloy matrix at a temperature between a melting point of the low temperature melting phase and a melting point of the high temperature melting phase or below the temperature of the low temperature melting phase.

9. The article of claim 2, wherein the article is an article of aerospace equipment or an article of nuclear reactor equipment.

10. A composite comprising:
a metal alloy matrix; where the metal alloy matrix comprises aluminum in an amount greater than 50 atomic percent to up to 99 atomic percent; a first metal dispersed in the metal alloy matrix, where the first metal is present in an amount of 1 to 50 atomic percent; and where the metal alloy matrix comprises a low temperature melting phase and a high temperature melting phase; where the low temperature melting phase melts at a temperature that is lower than the high temperature melting phase; and
a contracting constituent, where the contracting constituent comprises a material having a negative coefficient of thermal expansion; where the contracting constituent exerts a compressive force on the metal alloy matrix at a temperature between a melting point of the low temperature melting phase and a melting point of the high temperature melting phase.

11. The composite of claim 10, where the first metal is silicon.

12. The composite of claim 11, where the silicon is present in an amount of 2 to 18 atomic percent, based on a total atomic composition of the metal alloy matrix.

13. The composite of claim 10, where the aluminum is present in an amount of 80 to 98 atomic percent, based on a total atomic composition of the metal alloy matrix.

14. The composite of claim 10, where the material having a negative coefficient of thermal expansion is selected from the group consisting of $ZrW_2O_8$, $ZrMo_2O_8$, $HfW_2O_8$, $HfMo_2O_8$ and $ZrV_2O_7$.

15. The composite of claim 10, wherein the melting point of the low temperature melting phase and the melting point of the high temperature melting phase are at least 50° C. apart from each other.

16. An article comprising a composite comprising:
a metal alloy matrix; where the metal alloy matrix comprises aluminum in an amount greater than 50 atomic percent to up to 99 atomic percent; a first metal dispersed in the metal alloy matrix, where the first metal is present in an amount of 1 to 50 atomic percent; and where the metal alloy matrix comprises a low temperature melting phase and a high temperature melting phase; where the low temperature melting phase melts at a temperature that is lower than the high temperature melting phase; and
a contracting constituent, where the contracting constituent comprises a material having a negative coefficient of thermal expansion; where the contracting constituent exerts a compressive force on the metal alloy matrix at a temperature between a melting point of the low temperature melting phase and a melting point of the high temperature melting phase.

17. The article of claim 16, wherein the article is an article of aerospace equipment or an article of nuclear reactor equipment.

18. A composite comprising:
a metal alloy matrix; where the metal alloy matrix comprises aluminum in an amount greater than 50 atomic percent to up to 99 weight percent; a first metal and a second metal; where the first metal is different from the second metal, where the second metal is silicon, where the silicon is present in an amount of 1 to 17 atomic percent, based on a total atomic composition of the metal alloy matrix; and where the metal alloy matrix comprises a low temperature melting phase and a high temperature melting phase; where the low temperature melting phase melts at a temperature that is lower than the high temperature melting phase; and
a contracting constituent; where the contracting constituent exerts a compressive force on the metal alloy matrix at a temperature between a melting point of the low temperature melting phase and a melting point of the high temperature melting phase or below the temperature of the low temperature melting phase.

19. The composite of claim 18, where the first metal is copper.

20. The composite of claim 19, where the copper is present in an amount of 2 to 18 atomic percent, based on a total atomic composition of the metal alloy matrix.

21. The composite of claim 18, where the aluminum is present in an amount of 65 to 96 atomic percent, based on a total atomic composition of the metal alloy matrix.

22. The composite of claim 18, where the contracting constituent is a shape memory alloy.

23. The composite of claim 22, where the shape memory alloy is selected from Ti(NiPt), Ti(NiPd), Ti(NiAu), (TiHf)Ni, NiTi, NiTiSn, indium-titanium based alloys, nickel-aluminum based alloys, nickel-gallium based alloys, copper based alloys, gold-cadmium based alloys, silver-cadmium based alloys, indium-cadmium based alloys, manganese-copper based alloys, iron based alloys, and a combination thereof.

24. The composite of claim 18, where the contracting constituent comprises a material having a negative coefficient of thermal expansion.

25. The composite of claim 18, wherein the melting point of the low temperature melting phase and the melting point of the high temperature melting phase are at least 50° C. apart from each other.

26. An article comprising a composite comprising:
a metal alloy matrix; where the metal alloy matrix comprises aluminum in an amount greater than 50 atomic percent to up to 99 weight percent; a first metal and a second metal; where the first metal is different from the second metal, where the second metal is silicon, where the silicon is present in an amount of 1 to 17 atomic percent, based on a total atomic composition of the metal alloy matrix; and where the metal alloy matrix comprises a low temperature melting phase and a high temperature melting phase; where the low temperature melting phase melts at a temperature that is lower than the high temperature melting phase; and a contracting constituent; where the contracting constituent exerts a compressive force on the metal alloy matrix at a temperature between a melting point of the low temperature melting phase and a melting point of the high temperature melting phase or below the temperature of the low temperature melting phase.

27. The article of claim 26, wherein the article is an article of aerospace equipment or an article of nuclear reactor equipment.

28. A composite comprising:
a metal alloy matrix; where the metal alloy matrix comprises aluminum in an amount greater than 50 to up to 99 atomic percent; a first metal dispersed in the metal alloy matrix, where the first metal is present in an amount of 1 to 50 atomic percent, where the first metal is silicon; and where the metal alloy matrix comprises a low temperature melting phase and a high temperature melting phase; where the low temperature melting phase melts at a temperature that is lower than the high temperature melting phase; and a contracting constituent; where the contracting constituent exerts a compressive force on the metal alloy matrix at a temperature between a melting point of the low temperature melting phase and a melting point of the high temperature melting phase.

29. The composite of claim 28, where the aluminum is present in an amount of 80 to 98 atomic percent, based on a total atomic composition of the metal alloy matrix.

30. The composite of claim 28, where the silicon is present in an amount of 2 to 18 atomic percent, based on a total atomic composition of the metal alloy matrix.

31. The composite of claim 28, where the contracting constituent is a shape memory alloy.

32. The composite of claim 31, where the shape memory alloy is selected from Ti(NiPt), Ti(NiPd), Ti(NiAu), (TiHf)Ni, NiTi, NiTiSn, indium-titanium based alloys, nickel-aluminum based alloys, nickel-gallium based alloys, copper based alloys, gold-cadmium based alloys, silver-cadmium based alloys, indium-cadmium based alloys, manganese-copper based alloys, iron based alloys, and a combination thereof.

33. The composite of claim 31, where the contracting constituent comprises a material having a negative coefficient of thermal expansion.

34. The composite of claim 33, where the material having a negative coefficient of thermal expansion is selected from the group consisting of $ZrW_2O_8$, $ZrMo_2O_8$, $HfW_2O_8$, $HfMo_2O_8$ and $ZrV_2O_7$.

35. The composite of claim 28, wherein the melting point of the low temperature melting phase and the melting point of the high temperature melting phase are at least 50° C. apart from each other.

36. An article comprising a composite comprising:
a metal alloy matrix; where the metal alloy matrix comprises aluminum in an amount greater than 50 to up to 99 atomic percent; a first metal dispersed in the metal alloy matrix, where the first metal is present in an amount of 1 to 50 atomic percent, where the first metal is silicon; and where the metal alloy matrix comprises a low temperature melting phase and a high temperature melting phase; where the low temperature melting phase melts at a temperature that is lower than the high temperature melting phase; and a contracting constituent; where the contracting constituent exerts a compressive force on the metal alloy matrix at a temperature between a melting point of the low temperature melting phase and a melting point of the high temperature melting phase.

37. The article of claim 36, wherein the article is an article of aerospace equipment or an article of nuclear reactor equipment.

38. A composite comprising:
a metal alloy matrix; where the metal alloy matrix comprises aluminum in an amount greater than 50 atomic percent to up to 99 weight percent; a first metal and a second metal; where the first metal is different from the second metal, where the second metal is silicon; and where the metal alloy matrix comprises a low temperature melting phase and a high temperature melting phase; where the low temperature melting phase melts at a temperature that is lower than the high temperature melting phase; and a contracting constituent, where the contracting constituent comprises a material having a negative coefficient of thermal expansion; where the contracting constituent exerts a compressive force on the metal alloy matrix at a temperature between a melting point of the low temperature melting phase and a melting point of the high temperature melting phase or below the temperature of the low temperature melting phase.

39. The composite of claim 38, where the first metal is copper.

40. The composite of claim 39, where the copper is present in an amount of 2 to 18 atomic percent, based on a total atomic composition of the metal alloy matrix.

41. The composite of claim 38, where the aluminum is present in an amount of 65 to 96 atomic percent, based on a total atomic composition of the metal alloy matrix.

42. The composite of claim 38, where the silicon is present in an amount of 1 to 17 atomic percent, based on a total atomic composition of the metal alloy matrix.

43. The composite of claim 38, where the material having a negative coefficient of thermal expansion is selected from the group consisting of $ZrW_2O_8$, $ZrMo_2O_8$, $HfW_2O_8$, $HfMo_2O_8$ and $ZrV_2O_7$.

44. The composite of claim 38, wherein the melting point of the low temperature melting phase and the melting point of the high temperature melting phase are at least 50° C. apart from each other.

45. An article comprising a composite comprising:
a metal alloy matrix; where the metal alloy matrix comprises aluminum in an amount greater than 50 atomic percent to up to 99 weight percent; a first metal and a second metal; where the first metal is different from the second metal, where the second metal is silicon; and where the metal alloy matrix comprises a low temperature melting phase and a high temperature melting phase; where the low temperature melting phase melts at a temperature that is lower than the high temperature melting phase; and a contracting constituent, where the contracting constituent comprises a material having a negative coefficient of thermal expansion; where the contracting constituent exerts a compressive force on the metal alloy matrix at a temperature between a melting point of the low temperature melting phase and a melting point of the high temperature melting phase or below the temperature of the low temperature melting phase.

46. The article of claim 45 wherein the article is an article of aerospace equipment or an article of nuclear reactor equipment.

* * * * *

UNITED STATES PATENT AND TRADEMARK OFFICE
CERTIFICATE OF CORRECTION

PATENT NO. : 10,597,761 B2
APPLICATION NO. : 15/318194
DATED : March 24, 2020
INVENTOR(S) : Michele Viola Manuel, Charles Robert Fisher and Maria Clara Wright It is certified that error appears in the above-identified patent and that said Letters Patent is hereby corrected as shown below:

In the Specification

Statement Regarding Federally Sponsored Research & Development:

Column 1, Lines 19-20: "This invention was made with government support under Contract Number NNX12AP71A awarded by NASA." should read "This invention was made with government support under grant number NNX12AP71A, awarded by NASA Kennedy Space Flight Center."

Signed and Sealed this
Fourteenth Day of June, 2022

Katherine Kelly Vidal
*Director of the United States Patent and Trademark Office*